United States Patent [19]

Coutta

[11] 4,327,819
[45] May 4, 1982

[54] OBJECT DETECTION SYSTEM FOR A SHOPPING CART

[76] Inventor: John M. Coutta, 450 Superior Ave., Decatur, Ga. 30030

[21] Appl. No.: 174,678

[22] Filed: Aug. 1, 1980

[51] Int. Cl.³ ............................................. G08B 13/00
[52] U.S. Cl. ...................................... 186/62; 340/568
[58] Field of Search ............... 340/674, 666, 568, 572, 340/556; 186/52, 53, 62, 63, 59, 19, 20, 27, 31, 32

[56] References Cited

U.S. PATENT DOCUMENTS

| | | | |
|---|---|---|---|
| 3,051,936 | 8/1962 | Finger et al. | 340/666 |
| 3,263,774 | 8/1966 | Reese | 186/62 |
| 3,457,423 | 7/1969 | Gtarkly | 186/62 |
| 3,725,894 | 4/1973 | Geisler | 340/568 |

Primary Examiner—H. Grant Skaggs
Attorney, Agent, or Firm—C. A. Phillips

[57] ABSTRACT

A shopping cart wherein the positioning of an article on a lower tray is signalled to a checkout attendant. A tray is pivotally supported at one end and spring biased in an upper position at an opposite end. A reflector is positioned on the tray such that it is moved to a lower position when an object is placed on the tray. A beam of light is directed across the path of a cart as it approaches a checkout position. This beam is at an elevation to strike the reflector when the tray is deflected downward by the weight of an object. A light sensor is positioned to detect light reflected by the reflector and to initiate a signal to a checkout attendant, alerting the attendant to the fact that there is an object on the tray.

5 Claims, 4 Drawing Figures

OBJECT DETECTION SYSTEM FOR A SHOPPING CART

TECHNICAL FIELD

This invention relates to shopping carts, and particularly to a system for determining the presence of an object on a lower, and not readily observable, shelf or tray of the cart.

BACKGROUND ART

Some years back, manufacturers of shopping carts commenced including on their carts a tray underneath a conventional basket of a cart. The tray is typically used to hold large items which are too bulky or heavy to be placed in the basket along with other, and typically smaller, objects. This originally seemed like a good idea as the user of a cart, the customer of a business establishment, would have more hauling space to accommodate purchases and would tend to add more items to his purchases. However, in the past few years, it was discovered that in a significant percentage of instances, items placed on the lower tray were not observed by checkout attendants and were not paid for. In fact, in one survey it was found that this figure was approximately 85%.

In any event, in recognition of the losses incurred, there has been a decline in the employment of carts with lower shelves as the only known feasible way of combating this problem. This, of course, has been done at the expense of some decrease in sales. Unfortunately, the recognition of the problem has not, to date, brought forth a solution. True, there have been some attempts to solve it by some form of signalling system, but there has been no acceptable solution determined. Reese U.S. Pat. No. 3,263,774 expressly recognizes the problem and proposes that a checkout attendant be required to lean over the counter and thus be in a position to observe whether an object is on the tray before being able to complete the customer transaction. This requirement is enforced by a switch on the side of the counter adjacent to a cart which controls the cash register operation and which can only be reached if a checkout attendant leans over the cart. While a tall checkout attendant with a long reach might not have any difficulty with such an arrangement, many could not, at least comfortably, use such a system. To the knowledge of the applicant, the difficulties of the system overcome its advantages, and its use on any scale was not continued.

Thus, it is the object of this invention to provide an automatically operable system which requires no maneuvering by the attendant to use it, is effective, and is available at a moderate cost.

DISCLOSURE OF THE INVENTION

In accordance with this invention, there is provided a system for the detection of the presence of an object on the lower shelf or tray of a shopping cart through the deflection of a reflector by the weight of the object. A light is directed at a level which will be intercepted by the reflector as the shelf is so deflected, and in such case, the reflected light is detected to signal the presence of an object.

DETAILED DESCRIPTION OF THE DRAWINGS

Figure 1:
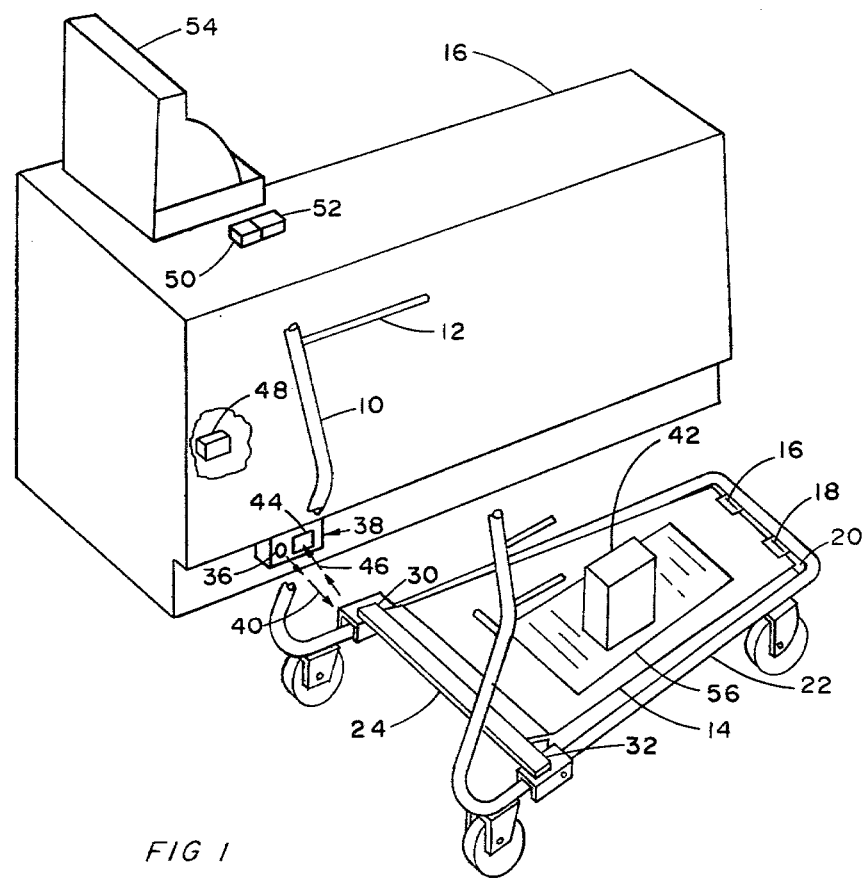
FIG. 1 is a pictorial view illustrating an embodiment of the invention.
Figure 4:
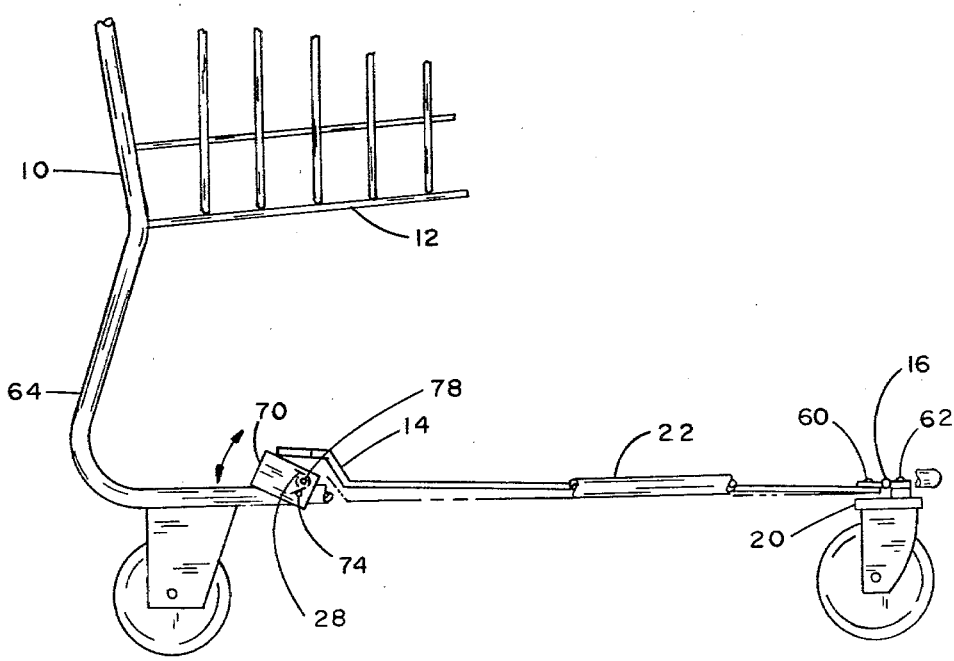
FIG. 4 is a side view of the shopping cart as shown in FIG. 1 as viewed from the left side.

Referring to the drawings, and initially to FIG. 1, there is illustrated generally a conventional shopping cart 10 having a top basket 12 (partially shown) and a lower tray 14, both being for the accommodating of purchased items in a business establishment. Tray 14 would typically be a plastic injection moulding. Alternately, it would be formed conventionally of a woven wire construction. As shown, cart 10 is positioned at a checkout counter 16 of such an establishment so as to accommodate the checkout function in which a customer is charged with and pays for items carried by the shopping cart. Significantly, lower tray 14 of cart 10 is hinged by hinges 16 and 18 to support bar 20, which in turn is mounted to cart frame 22 (FIG. 4). The rear region 24 of tray 14 is supported by extended ends 30 and 32 resting upon brackets 68 and 70, which are pivot mounted to frame 22 by bolts 72 and 74 and are held in a normal angled position by torsional springs 26 and 28, which are retained by pins 76 and 78, respectively, as shown more clearly in FIG. 2. A reflector 34 is mounted on the side of bracket 68 (by means not shown) and is oriented to reflect light directed substantially on it from a light source 36 of optical source/detector assembly 38 mounted on checkout counter 16 (by means not shown). Source 36 (e.g., a light emitting diode) directs a pencil size beam of light along a selected path 40 at an elevation wherein, with an object 42 placed on tray 14, and tray 14 depressed to the position shown, the light beam 40 would strike reflector 34. Conventional optical sensor 44 (e.g., a phototransistor) in optical source/detector assembly 38 then receives the reflected beam 46 from reflector 34 and provides an electrical output to a conventional signal triggered timer 48 mounted in counter 16 (by means not shown). Timer 48 in turn provides electrical outputs for a selected period to either or both of signal light 50 and an audible signal transducer, e.g, buzzer 52, which are mounted adjacent to cash register 54 in such a way as to conveniently alert a checkout attendant to the presence of merchandise 42 on lower tray 14. Typically, timer 48 is of a type which is adjustable to provide inputs to signal light 50 and transducer 52 for periods ranging from 2 to 10 seconds, thus automatically terminating the signals at the end of the selected time period, and eliminating the necessity for a manual shut-off action on the part of the checkout attendant. In one example, a signal from optical sensor 44 would trigger on a latching type relay which would then be held on by a conventional resistance-capacitance type timing circuit.

The economic value of a shopping cart such as cart 10, which is equipped with plastic tray 14, can be significantly enhanced by providing advertising displays on the tray. This would typically be done by imprinting the advertisement in an appropriate location 56 on the top surface of the tray.

Figure 2:
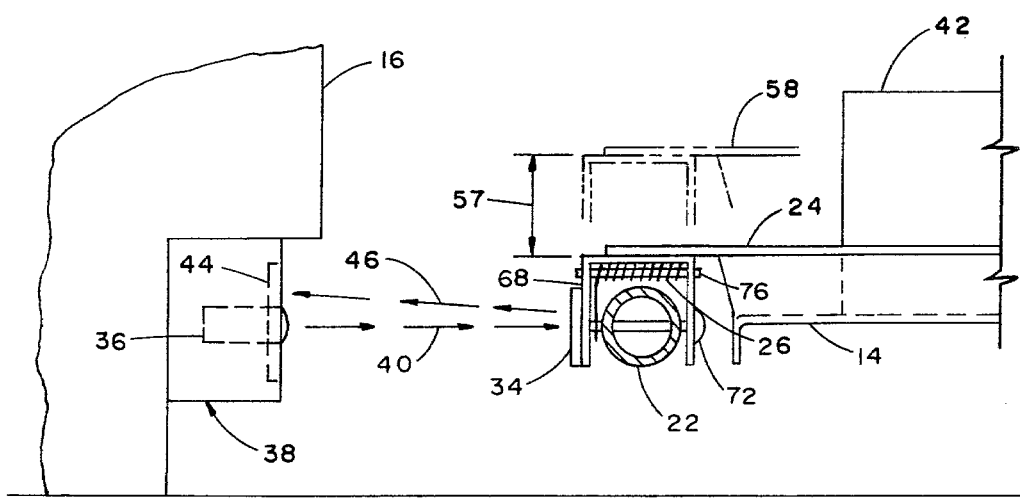
FIG. 2 is a partial end view of the illustration of FIG. 1.

FIG. 2 particularly illustrates the vertical alignment of the elements of the optical system and the discrete vertical displacement 57 which occurs as reflector 34 moves downward as bracket 68 is pivoted downward by tray 14 under the weight of an object 42. Light source 36 typically projects a thin pencil beam 40 which strikes reflector 34 when the reflector is moved downward through a distance of from ½ to 1½ inches, or through an effective range of one inch of travel. Reflected beam 46 strikes optical sensor 44, which provides the electrical output to timer 48 (FIG. 3).

When there is no merchandise, such as object 42, on tray 14, springs 26 and 28 hold the rearward end 24 of tray 14 in the normal upward position 58, which accordingly moves reflector 34 above the effective path of light beam 40.

Figure 3:
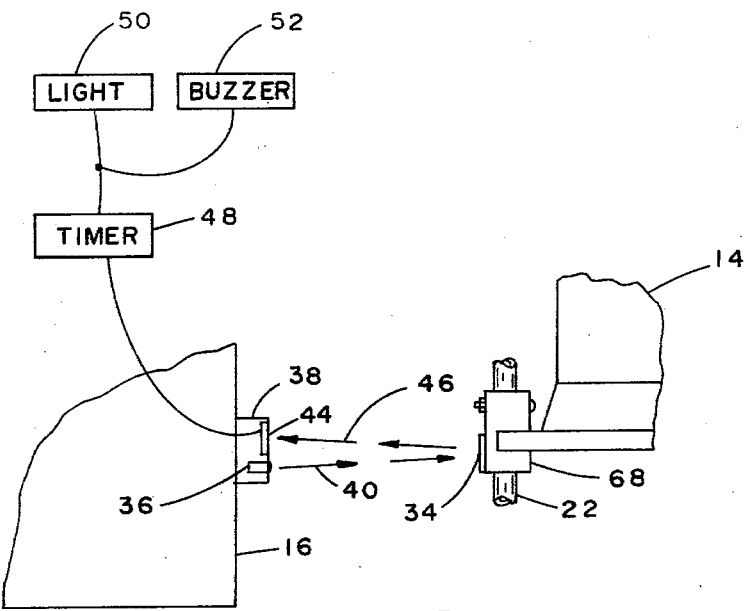
FIG. 3 is a largely schematic illustration of the operating system of the invention.

Referring more specifically to FIG. 3, the horizontal alignment of optical source/detector assembly 38 and reflector 34 is shown. Reflector 34 is typically 1½ inches in diameter, and when brought within relatively close proximity to light source 36, and when the tray is depressed the requisite distance by a load, light source 36 would provide a reflected beam 46 detectable by optical sensor 44.

FIG. 4 is a side elevational view of cart 10, showing tray 14 hinged to support bar 20 by hinges 16 and 18 (FIG. 1). Hinges 16 and 18 are fastened to tray 14 by means of rivets 60 and to support bar 20 by means of rivets 62. The hinges allow tray 14 to pivot downward under the weight of merchandise placed on the tray and to pivot upward when the front end of another cart is pushed forward into the rear open end 64 of cart frame 22. This enables a number of shopping carts to be nested or stacked in the usual manner to conserve floor space when not in use. Brackets 68 and 70 (FIG. 1) and reflector 34 are positioned so as to avoid interference with other carts while nested or stacked.

Assume now that a store customer has finished shopping and pushes cart 10 up to and along checkout counter 16. Assume further that the customer has placed in cart 10 an object 42 which has sufficient weight to press tray 14 downward sufficient to lower mirror 34 to a level where, when moved past beam 46, the beam will be intercepted by sensor 44. In such instance, the detection system will be triggered, and the checkout clerk will be alerted to walk around counter 16 or otherwise position himself in order to view the tray and thus charge the customer for the object. Springs 26 and 28 are typically chosen to essentially support the weight of tray 14 without significant deflection. Typically, the springs would be such that with a ½ pound object positioned in the mid region of tray 14 (shown), tray 14 would typically be deflected downward to position mirror 34 at a triggering level. Obviously, if the object is positioned more to the front of the cart, a slightly heavier object is required to effect triggering; and if positioned more to the rear of the cart, a somewhat lesser weight is necessary to effect triggering. While it is possible that, by virtue of the particular positioning of an object, a very light one might become undetected, in practice, such would rarely occur.

It is not necessary that the cart be positioned such that cart 14, and thus mirror 34, be stationary for the alerting system of this invention to be triggered. Cart 10 may be moved rapidly along counter 16, and thus mirror 34 rapidly pass across beam 40 and the system still be operated. It is only necessary that light be detected for a brief instant to trigger on timer 48 and thus light 50 and/or buzzer 52. Upon being turned on, the alerting signal (S) remains on for the time period determined by timer 48.

While tray 14 is indicated as being directly attached to bar 20 on frame 22, alternately, it may be pivotally attached to the front region of a conventional tray already on a cart. In such case, it may be spring biased with respect to the existing tray by a spring (either leaf or coil type) positioned between the trays in the rear region of the trays. In such case, the spring bias means may either be on the side of the trays or may be positioned in the front region between the sides. Alternately, trays 14 may be sprung directly on frame 22. The significant thing is that mirror 34 would be deflectable by virtue of a weighted object being placed on the upper of the trays in the manner described.

Accordingly, it is believed that the present invention provides, for the first time, a practical and workable system for preventing store losses from merchandise undetected on the lower trays of shopping basket carts. The savings due to the reduction in such losses can, it is believed, lead to a perceptible decrease in overall operating costs of stores, and thus enable merchandise to be sold for a perceptibly lower price.

I claim:

1. A retail merchandising system comprising:
 a checkout counter;
 a passageway adjacent to said counter and adapted to permit a basket cart to pass alongside said checkout counter;
 a basket cart comprising:
  a frame,
  four wheels connected to and supporting said frame, and
  two rear wheels with fixed directivity and two front wheels with variable directivity;
 an upper positioned basket on said frame;
 a tray pivotally supported on a lower region of said frame and having a pivotal axis of coupling to said frame across a front end region of said cart;
 spring bias means for elevating a rear end of said tray with respect to said frame;
 a mirror coupled to a generally rear region of said tray and oriented to reflect light directed to it from one side of said cart, and said mirror being normally raised by said spring bias means;
 a source of light positioned to one side of said passageway and adapted and oriented to direct a beam of light across said passageway and the path of a basket cart as it is moved along said passageway, and said beam being at an elevation such that with no weight provided by an object to said tray, said tray is biased upward by said bias means to an elevation wherein said beam will pass below said mirror;
 light responsive means positioned adjacent to said light source and being oriented to receive said beam as a reflection from said mirror when said tray and said mirror are deflected downward by the weight of an object on the tray; and
 signal means responsive to the output of said light responsive means for indicating the presence of an object on a said tray.

2. A retail merchandising system as set forth in claim 1 wherein said light source and said light responsive means are positioned on said counter.

3. A retail merchandising system as set forth in claim 2 wherein said spring bias means comprises at least one coil spring coupled between a near side edge region of said tray and said frame.

4. A retail merchandising system as set forth in claim 3 wherein said spring bias means positions a said unloaded tray at an elevation wherein the downward travel of a said tray, under weight of an object, before said reflector is positioned to reflect said beam is at least one-half inch.

5. A retail merchandising system as set forth in claim 3 wherein spring bias means comprises an arm pivotally supported on said frame and a spring operatively coupled between said arm and said frame.

* * * * *